Figure 1:
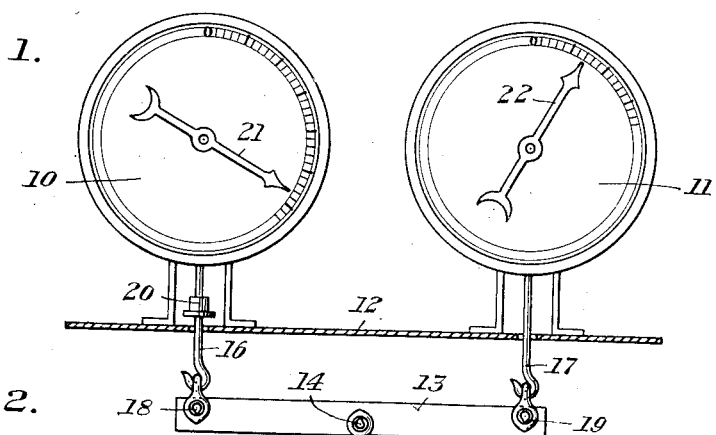

Sept. 20, 1938.      W. H. VENABLE      2,130,821
WEIGHING APPARATUS
Filed July 15, 1937

INVENTOR
William H. Venable
by his attorneys
Stebbins, Blenko & Parmelee

Patented Sept. 20, 1938

2,130,821

UNITED STATES PATENT OFFICE 2,130,821

WEIGHING APPARATUS

William H. Venable, Pittsburgh, Pa., assignor to Blaw-Knox Corporation, Pittsburgh, Pa., a corporation of New Jersey Application July 15, 1937, Serial No. 153,693

2 Claims. (Cl. 265—59)

This invention relates to the art of measuring out predetermined quantities of materials as, for instance, by weighing. In many instances it is desirable to measure out successively various quantities of different materials into a common receiver and, after all the materials have been measured, to discharge the receiver. A familiar example of such practice is the measuring of the ingredients of concrete, such as sand, cement and stone, into a weigh hopper, and, after all the components have been measured, discharging the entire batch into a mixer. It has been the practice heretofore, in installations of this kind, to employ the same scale to indicate the weights of several different components. This practice has permitted excessive variations in the amount of certain materials, particularly those of which a relatively small quantity is used. If a scale beam or dial is calibrated for weighing a 2,000 lb. batch of material to within two lbs. accuracy, the actual batch might be as great as 2002 lbs., or as little as 1,998 lbs. The error is only .1% over or under. Ordinarily, this would be satisfactory for apportioning. But if it be desired to weigh out 1950 lbs. of one material and to add 50 lbs. of another, the actual weight of the first material might be any amount between 1948 lbs. and 1952 lbs., and of the combined material between 2002 lbs. and 1998 lbs. Consequently, instead of 50 lbs. of the second material we might have any quantity between 54 lbs. and 46 lbs.—an error of 4 lbs. either way, or 8% on the desired quantity, which would be unsatisfactory.

I have invented an apparatus for weighing which overcomes the aforementioned objection to the present practice in this art. The object of my invention is to make it possible to weigh out a plurality of components of a batch without discharging the batch from a weigh hopper until all components have been delivered thereto, and obtain a high degree of precision in the measurement of each component, regardless of the amount thereof which is required. In accordance with the invention, I suspend a weighing receptacle in the manner usual with scales of the hopper or the platform type, on the usual levers for reducing the load transferred to the measuring devices. This load is usually brought to a single member, which actuates the measuring devices, which may be of any desired kind. However, in my device, I divide this load by means of a floating lever, so that it may be measured by either one of the two measuring systems, adapted to accurate weighing of loads of different amounts and differently calibrated therefor.

A simple embodiment of the invention and a modification thereof are illustrated in the accompanying drawing. While these embodiments are preferred at present, the invention may be otherwise embodied and practiced within the scope of my broader claims. In my drawing, Figure 1 is a diagrammatic illustration of a simple form of apparatus, whereby the invention may be practiced, adapted to dial indicating scales and Figure 2 is a similar view showing a slightly modified form of apparatus adapted to multiple beam scales.

Figure 2:
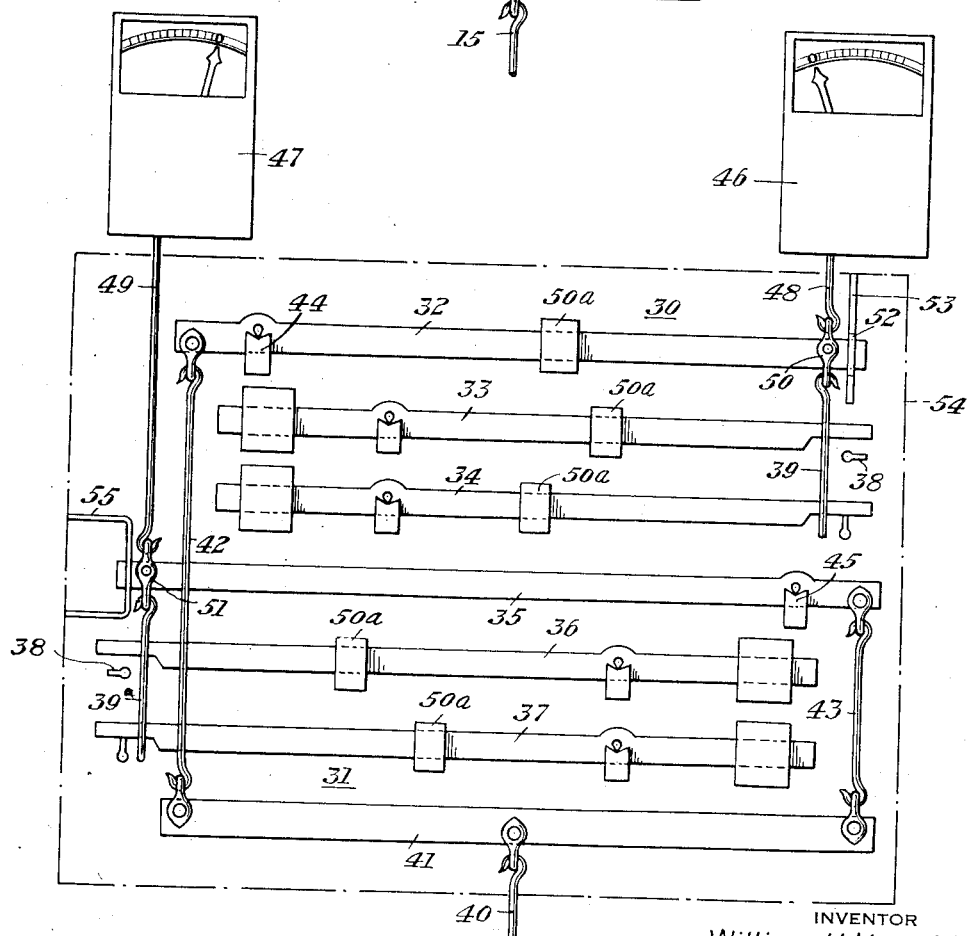

Referring now in detail to the drawing and, for the present, to Figure 1 particularly, I provide dial scales 10 and 11 and mount them on any suitable support 12. The scales 10 and 11 may be of any type conveniently available. A weigh hopper (not shown) is suspended from the scales by means of a floating beam 13 jointly carried thereby. The hopper may be supported on a knife edge 14 by a hanger 15. The beam 13 is similarly suspended from the scales 10 and 11 by hangers 16 and 17 and knife edges 18 and 19. The hanger 16 is provided with a stop collar 20 adapted to engage the support 12 when the hanger 16 has been lowered to the full limit permitted by the capacity of the scale 10. Thereafter, the lefthand end of the beam 13 remains fixed, while the righthand end continues to descend as the weight of material in the hopper increases.

While I have shown the knife edge 14 disposed centrally between the knife edges 18 and 19, this relation is not essential. With this arrangement the scale 11 must be of sufficient capacity to carry half of the maximum load to be supported by hanger 15, while the scale 10 is of lower capacity, sufficient only to permit weighing of the maximum needed amounts of the materials used in smaller quantities. By positioning the knife edge 14 closer to the knife edge 19, it is possible to make the scales 10 and 11 identical, except for their calibration. The distances between the knife edge 14 and the knife edges 18 and 19, in such case, should be made inversely proportional to the capacity for which the scales 10 and 11 are calibrated, respectively.

The invention may be readily explained, if it is assumed that the scale 10 is calibrated from zero to 300 lbs., while the scale 11 is calibrated from zero to 2000 lbs., and that both scales are accurate to within .1% of their total calibration. If 300 lbs. of a given batch component are delivered to the hopper, this will cause a 180° deflection of the pointer 21 of scale 10, since the total weight is divided equally between two scales. The scale 10 may be calibrated, however, to read 300 lbs. at 180° from the zero point. The scale 11 may be similarly calibrated so that its pointer 22 will read the full load of 300 lbs. While the scale 10 will indicate 300 lbs., the actual weight of material will be between 299.7 and 300.3 lbs.,—or .3 lb. under or over.

Assuming that another component of the batch is to be used in an amount of 1500 lbs., this material, when delivered to the weigh hopper, causes the stop collar 20 on the hanger of the scale 10 to engage the support 12. The pointer 21 is no farther deflected. The pointer 22 of the scale 11, however, advances to read the full desired weight of all the material in the weigh hopper, viz., 1800 lbs. The scale 11 is capable of weighing 2,000 lbs. with an accuracy of .1% or to within 2 lbs., so the actual weight of material when the dial pointer indicates 1800 lbs. will be between 1802 lbs. and 1798 lbs. The atcual weight of the second material added will therefore be between 1802—299.7=1502.3 lbs. and 1798—300.3=1497.7 lbs.; or 2.3 lbs. over or under on 1500 lbs.—a maximum error of .153%, which is satisfactory for most commercial processes.

In the above example, scale 10 would be read only when weighing the first component of 300 pounds, since the calibration of scale 11 is such that it cannot be read with precision for this small amount. The net weight of the first component is subject only to the error involved in reading scale 10, which is small, while the net weight of the second component is subject to the combined errors of reading scales 10 and 11 successively, the actual weight of the component being the difference between these two readings. It may not be necessary in all instances to calibrate scale 11 to cover the entire range indicated by scale 10, but this, of course, is optional.

Figure 2 illustrates multiple beam scales 30 and 31, arranged in substantially the same manner in which the dial scales are disposed in Figure 1. The scale 30 includes a tare beam 32 and weigh beams 33 and 34. Similarly, the scale 31 includes a tare beam 35 and weigh beams 36 and 37. Such multiple beam scales are known per se and, as usual, are provided with keepers 38, whereby either of the weigh beams may be rendered ineffective. Ordinarily, the counter-poises on these beams exert their effect on the tare beam through yoke 39 and clevis 50 and the yoke 39a and clevis 51. The object of providing a plurality of weigh beams is to facilitate the rapid and repeated measurement of fixed quantities of different kinds of material without resetting a counter-poise for each weighing operation. The clevises 50 and 51 are pivoted to their respective tare beams, preferably by knife edge or anti-friction bearings. Their upper limbs connect with the rods 48 and 49 which actuate the indicating dial scales 46 and 47.

A weigh hopper or platform (not shown) is partially supported through usual lever systems, on a hanger 40 carried by a floating beam 41. The beam 41 is suspended by links 42 and 43 from the short lever arms of the tare beams 32 and 35. The latter are supported on knife edges 44 and 45. The weigh beams 33, 34, 36 and 37 are similarly supported.

These scales are so adjusted and calibrated that when the tare beams are in their balanced positions they indicate zero. If the tare beams are above their balanced positions, they will indicate over-weight; if below, under-weight. The entire equipment is so adjusted that when none of the weigh beams is engaged to the tare beams and the weighing receptacle is empty, the tare beams are in proper balanced position and the indicator pointers at zero. In the arrangement shown in Figure 2, if it is assumed that the tare beam 32 and weigh beams 33 and 34 are employed to weigh loads which are light, relative to those which the tare beam 35 and the weigh beams 36 and 37 are employed to weigh, the dial scale 46 is made sensitive to small changes in the total load, while the scale 47 is so designed as to be suitable for taking care of larger discrepancies. Injury to the scale 46 is prevented in the same manner as the arrangement in Figure 1. The end of the long arm of the beam 32 extends through an eye 52 in a fixed member 53 which may be carried within the beam box indicated at 54. A bracket 55 similarly limits movement of the long arm of the beam 35.

In the arrangement shown in Figure 1, it is obvious that the operator may weigh out more than two kinds of material. For instance, he might introduce 100 lbs. of material, judging the amount by the pointer 21 on dial 10, and then 150 lbs. more of another kind of material, judging the amount by the pointer indicating 250 lbs. on dial 10; and then judge other amounts on dial 11.

With the arrangement shown in Figure 2, however, he sets the poises on the weigh beams 33, 34, 36 and 37 for the desired amounts, then throws the respective beams into action in sequence, introducing material into the weigh hopper after throwing each beam 33 and 34 into action until the indicator 46 registers zero. Thereafter, throwing beams 36 and 37 in action and adding material sequentially until the pointer on indicator 47 registers zero two other ingredients are measured, the indicator 46 registering over-weight.

It is also within the contemplation of the invention to employ a dial scale connected to one of the tare beams shown in Figure 2. It will be understood, furthermore, that any suitable type of scale may be employed, i. e., spring balance, weight balance, etc.

It will be apparent from the foregoing description that the invention provides means for measuring out widely different amounts of various batch components with greater accuracy as to the smaller amounts than has been possible heretofore. The apparatus necessary for practicing the invention is simple, relatively inexpensive and capable of relatively wide variation to suit specific measuring or batching problems, and to accommodate itself to such equipment, suitable for the purpose, as may be available.

Although I have illustrated and described but one preferred practice of the invention, changes therein may be made without departing from the spirit of the invention or the scope of the appended claims.

I claim:

1. Apparatus for weighing widely differing weights of different materials delivered successively to a receiver before final discharge simultaneously therefrom, comprising a scale having a calibration of the order of the desired weight of the materials used in relatively small quantities, a second scale having a calibration several times that of the first mentioned scale and of the order of the desired weight of the materials used in relatively large quantities plus the desired weight of the material used in relatively small quantities, means transmitting the weight of said receiver and its contents to said scales jointly, and means limiting movement of said first mentioned scale when the weight of the receiver and its contents exceeds the capacity of said first mentioned scale, without affecting the response of said second mentioned scale to the weight of the receiver and its contents.

2. Apparatus for weighing cumulatively increments of different materials delivered successively to a receiver, comprising a weight indicating device calibrated for accurate weighing of quantities considerably less than the total capacity of the apparatus, a second weight indicating device calibrated for weighing up to the total capacity of the apparatus, means for transmitting predetermined proportions of the weight of the contents of said receiver to said weight indicating devices jointly, and means limiting movement of said first mentioned weight indicating device when the weight of the contents of the receiver exceeds the capacity of said first mentioned device without affecting the response of said second weight indicating device to the weight of the receiver and its contents.

WILLIAM H. VENABLE.